United States Patent [19]

Vio et al.

[11] Patent Number: 4,587,306

[45] Date of Patent: May 6, 1986

[54] PREPARATION OF POLYMERS OF HYDROXAMIC FUNCTIONS

[75] Inventors: Lino Vio, Pau; Gilles Meunier, Lescar, both of France

[73] Assignee: Societe Nationale Elf Aquitaine, Courbevoie, France

[21] Appl. No.: 526,027

[22] Filed: Aug. 24, 1983

[30] Foreign Application Priority Data

Sep. 28, 1982 [FR] France ............................... 82 16317

[51] Int. Cl.$^4$ ............................................... C08F 8/32
[52] U.S. Cl. ............................... 525/354; 525/329.4; 525/380
[58] Field of Search .................. 525/354, 980

[56] References Cited

U.S. PATENT DOCUMENTS

| | | | |
|---|---|---|---|
| 4,012,366 | 3/1977 | Naarmann et al. | 526/312 |
| 4,015,062 | 3/1977 | Eilingsfeld et al. | 526/240 |
| 4,021,397 | 5/1977 | Shab | 524/395 |
| 4,081,516 | 3/1978 | Scholten et al. | 210/734 |
| 4,397,996 | 8/1983 | Chiklis et al. | 525/380 |

*Primary Examiner*—Joseph L. Schofer
*Assistant Examiner*—Bernard Lipman
*Attorney, Agent, or Firm*—Burgess, Ryan and Wayne

[57] ABSTRACT

Improvements in the preparation of polymers of hydroxamic functions that consist in heating a polyacrylamide aqueous solution with a hydroxylamine salt at temperatures of from about 50° to 85° C.

The polymers obtained are used as adjuvants of soil drilling muds, especially in petroleum drilling.

The invention concerns itself with improvements in the preparation of polymers of hydroxamic functions, the resulting novel polymers, and applications thereof. The invention provides for the obtention of such polymers having a desired number of hydroxamic groups without noticeable formation of objectionable secondary products; it makes possible, in addition, the preparation of derivatives wherein the chain of the polymer and/or the hydroxamic groups contain different substituents.

12 Claims, No Drawings

PREPARATION OF POLYMERS OF HYDROXAMIC FUNCTIONS

BACKGROUND OF THE INVENTION

Polymers having hydroxamic functions are known as ion-exchangers and chelating agents which are particularly useful in the formation of iron complexes. One method for their preparation as described in U.S. Pat. No. 3,345,344 consists in treating, with concentrated HCl, a polyamidoxime obtained by the action of a hydroxylamine salt on a polyacrylonitrile. The residual presence of nitrile and amidoxime groups and, on the other hand, the necessity of an operation involving the use of concentrated acid are undesireable features of this method. Further, in French Pat. No. 2,476,113, the hydroxamic polymers are prepared by heating at 90° C. a polyacrylamide aqueous solution with the addition of hydroxylamine hydrochloride and sodium acetate. By this process, polymers are obtained with hydroxamic groups that have a very favorable effect on drilling muds specially those for petroleum wells. This procedure is of great industrial importance and justified the research aimed at improving the process described in the aforesaid French patent.

That was in fact the objective of studies that have led to the instant invention. This invention consists, in the first place, in the use of evidently lower temperatures than the temperature used in the French patent referred to supra. Although as a general rule the speed of a reaction increases with the temperature, in the instant case, there is observed the surprising result that the replacement of amido groups by hydroxamic functions takes place better at temperatures lower than 90° C. It is observed, in fact, that beyond 85° C., and mainly at 90° C. and above, the decomposition of the hydroxylamine becomes very quick, which causes the operation to result in a loss of said reagent when working at such temperatures.

According to the invention, the reaction of a hydroxylamine salt with polyacrylamide taken place at temperatures varying between about 50° and 85° C. and suitably, between about 60° to 80° C. At temperatures close to about 60° C., the reaction is too slow, but excellent results are obtained when what is sought is only to replace a small percentage of amido groups by hydroxamic groups; that is especially the case when replacing about 5 to 20% amido groups; the duration of the reaction is then on the order of from about a few hours to about 20 hours. For larger hydroxamination rates, it is convenient to work at temperatures of from about 65° to about 85° C., particularly close to about 70° C.; it is then possible, with an excellent yield of more than 25%, to replace the amido functions without substantial loss of hydroxylamine.

According to another embodiment of the invention, the ammonia formed during the heating is eliminated from the reaction medium; this makes stable the hydroxamic polymer and makes it possible to use it in the state of solution such as obtained by the reaction without previous separation or purification. The NH3 can be eliminated, for instance, by applying vacuum or by blowing an inert gas through the solution. A very advantageous means consists in elevating the temperature, at the end of the preparation, above about 85° C., suitably up to about 85° to 100° C. exactly for the time needed for removing the ammonia that is present. The heating to about 85°–100° C. likewise permits the elimination of the residues of toxic hydroxylamine. The presence of NH3 and of hydroxylamine, both toxic products, would make impracticable the manipulation of the product in the open. For preventing decomposition, this period of time should not exceed about 2 hours, and it is of approximately about 15 to 75 minutes.

By a particular characteristic of the invention, there is thus obtained a combined process that consists in first heating for several hours, the reaction medium at a temperature of from about 50° to about 80° C., and then terminating the work with a brief heating of less than about 2 hours at a temperature of from about 85° to about 100° C.

According to a further embodiment of the invention, for a given temperature, the rate of substitution of hydroxamic groups to amido groups can be modified by adequately regulating the molar proportion of hydroxylamine in relation to the polyacrylamide used. In general, this relation changes from about 0.2 to 1.2 moles of hydroxylamine salt per amido group present. The lower of these limits corresponds to the case where what is sought is to fix only a small amount of hydroxamic groups, while the limit of about 1.2 is about a 20% excess of hydroxylamine in relation to the necessary stoichiometry when it is desired to carry the replacement of amido groups by hydroxamic groups. The ratio (1) represents the theoretical proportions of the reaction

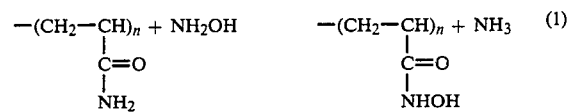

This reaction (1) is described disregarding the acid with which is really combined the hydroxylamine used.

Considering that the acrylamide-acid acrylo hydroxamic copolymers that include only about 10 to 60% hydroxamic group give excellent results in certain applications and in particular as additives in drilling muds, it is not necessary to carry on the process according to this invention until all the amide groups are replaced by hydroxamic groups; it practically suffices that this replacement be in the order of about 10 to 60%. Therefore, it is not necessary to use an excess of hydroxylamine in the reaction (1); it is most often enough that the above indicated hydroxylamine/amide ratio between about 0.2 and 1.2 should be in the order of about 0.35 to 0.65 and more suitably about 0.4 to 0.6.

As in the prior art, the reaction according to the invention is carried out in an aqueous medium, the polyacrylamide being suitably used at a concentration of about 50 to 500 g/l, or more suitably at about 150 to 350 g/l, the last concentrations corresponding to about 2 to 5 acrylamide units ($CH_2$—CH—$CONH_2$) per liter.

Different hydroxylamine salts can be used such as sulphate, sulphite, phosphate, perchlorate, hydrochloride, acetate, propionate, and the like, the hydrochloride being the product most commercially available. According to the nature of the salt used and consequently, according to the pH it gives in aqueous medium, it is important, in conformity with the invention, to adjust the pH of the reaction solution to a value of about 5 to 7.5 and suitably from about 6 to 7. Values of pH of from about 6.2 to 6.8 are most suitable. This adjustment can be made by means that are well known in the art such as by adding an appropriate amount of a base, especially, sodium or potassium hydroxide, lime, baryta, ammonia, or the like. In these conditions of pH, the reaction of the hydroxylamine on an amide is favored due to the quick kinetics of the reaction.

According to another embodiment of the invention, the ionic force of the aqueous solution, which constitutes the reaction medium, is increased as much as possible. Very favorable for this is the use of a hydroxylamine salt such as hydrochloride or sulphate with the addition of sodium or potassium hydroxide for adjusting the pH, since the mineral salt formed increases the velocity constant of the reaction. But since the concentration of strong electrolyte thus created is generally only on the order of from about 1 to 3 moles/l, it is advantageous, according to the invention, to add to the reaction medium about 1 to 10 moles more of strong electrolyte per liter. Such an electrolyte includes, for example, a salt such as sodium, potassium, ammonium or calcium chloride, a Na, K or NH$_4$ sulphate, etc.

The invention likewise effects a supplementary improvement by making it possible to economize hydroxylamine by preventing the oxidation in air of said reagent. For this, the reaction is preferably carried out in an oxygen-fee atmosphere that is under an atmosphere of nitrogen, CO$_2$, or other gas that is inert in respect to the hydroxylamine.

The process, perfected as it has been described, becomes applicable to different substituted hydroxylamines, as well as to different acrylamide or methacrylamide copolymers. It thus becomes possible to obtain a whole range of polymers and copolymers carriers of hydroxamic groups

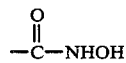

of which 1 or the 2 H atoms are substituted by hydrocarbon aliphatic or arylic radicals eventually substituted themselves; said radicals are alkyls or hydroxyalkyls, aryls or alkaryls; the alkyls are most often from C$_1$ to C$_{18}$ and the aryls and alkaryls derived from benzene or naphthalene. One or the two H can likewise be substituted by cycloalkyls, specially cyclopentyls and cyclohexyls. The substituent of one of these H can be identical with or different from that of the other H.

Those hydroxamic groups are obtained by the process described above wherein the hydroxylamine used carries precisely the desired substituents. Substituted hydroxylamines are known in the art, and therefore it is possible to use for the reaction with the polyacrylamide, an R—NH—OR' hydroxylamine in which R and/or R' are the radicals mentioned above and either R or R' can be a hydrogen atom.

What has been said in connection with hydroxamic products equally applied to the corresponding thio compounds that is,

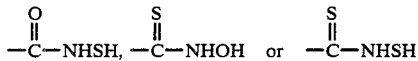

that are obtained from thiohydroxylamine or/and from polythioacrylamide, for example, following the diagrams:

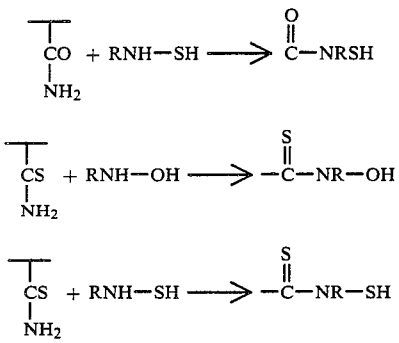

The different acrylamide or methacrylamide copolymers that can be used in the present process are selected among the different known copolymers in which the amidic elements are copolymerized with other acrylic or methacrylic derivatives such as acids, esters, salts such as, for example, acrylic acid, methyl acrylate, sodium acrylate, and the like; the copolymerized motifs can be those of maleic anhydride, vinyl acetate, vinyl pyrrolidone, or eventually of butadiene, or styrene or of acrylonitrile. One or more oxygen atoms can be replaced by sulphur atoms in the polymers used; thus, it is possible to use thioacrylamide, alkyl thioacrylate, alkaline thioacrylate polymers, and the like.

The acrylamide motifs that carry substituents on the nitrogen are equally suited to the preparation of the products according to the invention. Such is the case of the alkyls in C$_1$ to C$_{12}$, eventually hydroxylated, substituted with 1 or 2 H atoms of the amide function; an example of that is the acrylamide-methylol acrylamide copolymer or other alkanolacrylamides.

Although polymers of very different molecular weights, for instant, from about 500 to 100,000 can be treated according to the invention, particularly good results are obtained with polymers of rather low molecular weights. Thus, unlike the known technique where polyacrylamides of a molecular weight of about 20,000 were employed, the preferred characteristic of the invention consists in subjecting to the action of hydroxylamine a polymer having a molecular weight that does not exceed about 20,000. The preferred molecular weights are from about 1,000 to 20,000 or still better from about 1,200 to 6,000.

In the non-limiting examples that follow, the expression "hx rate" designates the % rate of replacement of the functional groups of the starting polymer by the hydroxamic groups; in other words, when the polymer treated is an acrylamide or methacrylamide homopolymer, the hx rate represents the % of initial amide —CONH$_2$ functions replaced by the —CO—NHOH hydroxamic acid functions. If there is used an acrylamide or methacrylamide copolymer with another monomer carrier of F functions or active groups, the hx rate % is understood in relation to the whole of the F-amide intial functions or groups.

The general mode of operation for producing a hydroxamic polymer according to the invention comprises the preparation of one kg aqueous solution, or polyacrylamide emulsion, or acrylamide copolymer. In this solution or emulsion, there was first dissolved the desired amount of hydroxylamine hydrochloride eventually substituted. The solution obtained was partly neutralized by slowly adding, under strong stirring, an aqueous potash solution at 36% so as to prevent the local saponification of the amide by KOH. Thus, the pH of the mixture was brought to the desired value, generally between about 6 and 7. Then followed a heating for several hours with stirring under a nitrogen atmosphere. The hx rate % was determined on aliquot parts of the reaction medium. In certain cases, the hydroxamic polymer was precipitated by the addition of ethanol to the solution after heating; it was dried and analyzed.

Several products obtained have been tested as additives of drilling muds.

The numerical results are found in the examples hereinbelow.

EXAMPLES 1 TO 7

The polyacrylamide, of which 1 kg aqueous solution at 24% by weight is used, has a molecular weight Mw of 1,500. The weight of hydroxylamine hydrochloride used is 117.5 g and that of KOH, used for the partial neutralization, of 74.2 g.

It results that the reaction medium contains:

| | |
|---|---|
| 3.38 moities | $(CH_2CH\ CONH_2)$ of monomer |
| 1.32 moles | $NH_2OH$ |
| 0.37 moles | $NH_2OH\ HCl$ |
| 1.32 moles | $KCl$ |

The molar ratio $(NH_2OH+NH_2OH.HCl):(CH_2\text{---}CH\text{---}CONH_2)=0.5$ and that of KOH/HYDROXYLAMINE=0.783, which brings a pH of 6.4.

| Example No. | 1 | 2 | 3 | 4 | 5 | 6 | 7 |
|---|---|---|---|---|---|---|---|
| T °C. of main heating | 65° | 65° | 70° | 70° | 80° | 80° | 90° |
| Duration in hours of the main heating | $10^h$ | $10^h$ | $6^h$ | $6^h$ | $6^h$ | $6^h$ | $6^h$ |
| Duration in hours of the final heating at 90° C. | — | $1^h$ | — | $1^h$ | — | $1^h$ | — |
| hx % rate of the product obtained | 28 | 26 | 34 | 34 | 32 | 32 | 30 |

It is seen that in an unexpected manner, although the heating at only 90° for 6 hours leads to a weak result, the termination at 90° in 1 hour of operations conducted from the very beginning between 65° and 80° brings nothing additional, but eliminate the excess of toxic $NH_3$ and hydroxylamine. The anlysis also shows that after 6 hours at 90° there take place losses of hydroxylamine by decomposition while 1 hour of heating at this temperature produces practically no loss.

EXAMPLES 8 TO 15

Following the general conditions of the preceding examples, a series of preparations have been made with different copolymers instead of the homopolyacrylamide. In the table hereinbelow the term "co-motif" indicates the monomer copolymerized with acrylamide and its ratio thereto.

| Ex. No. | Monomer | Molecular weight | Reaction conditions | hx % rate of the product obtained |
|---|---|---|---|---|
| 8 | Ethyl thioacrylate 30/70 | 5000 | 6 hours at 70° C. | 21 |
| 9 | Methylol acrylamide 20/80 | 2000 | 6 hours at 70° C. + 1 hour at 90° C. | 30 |
| 10 | Maleic anhydride 10/90 | 1500 | 6 hours at 70° C. + 1 hour at 90° C. | 40 |
| 11 | Sodium acrylate 30/70 | 3000 | 6 hours at 70° C. + 1 hour at 90° C. | 28 |
| 12 | Methylacrylamide 50/50 | 3000 | 6 hours at 70° C. + 1 hour at 90° C. | 33 |
| 13 | Acrylonitrile 30/70 | 4000 | 6 hours at 70° C. + 1 hour at 90° C. | 36 |
| 14 | Methyl acrylate 25/75 | 2500 | 6 hours at 70° C. + 1 hour at 90° C. | 31 |
| 15 | Ethyl methacrylate | 2800 | 6 hours at 70° C. + 1 hour at 90° C. | 27 |

As seen, certain copolymers (Examples 9–10) provide products richer in hydroxamic groups than homopolyacrylamide does.

EXAMPLES 16 TO 24

The starting polymer is the polyacrylamide as in Examples 1 to 7, while hydroxylamine hydrochloride is replaced by hydrochlorides of various substituted hydroxylamines. The molar proportions of reagents are the same as in Examples 1 to 7, and heating is effected at 70° C. for 6 hours and then at 85° C. for 2 hours.

| Ex. No. | Substituted hydroxylamine | hx % rate |
|---|---|---|
| 16 | $NH_2OCH_3$ | 30 |
| 17 | $NH_2OC_4H_9$ | 32 |
| 18 | $NH_2OC_6H_5$ | 28 |
| 19 | $CH_3\text{---}NHOH$ | 31 |
| 20 | $C_3H_7\text{---}NHOH$ | 29 |
| 21 | $C_6H_{13}\text{---}NHOH$ | 35 |
| 22 | $CH_3NH\text{---}OCH_3$ | 29 |
| 23 | $C_6H_5NH\text{---}OH$ | 26 |
| 24 | $C_6H_5NH\text{---}OCH_3$ | 19 |

EXAMPLE 25

Following the procedure of Examples 1 to 7, it is applied to an aqueous solution of 20% by weight polymethacrylate having a molecular weight of 3000. The mol. ratio KOH/hydroxylamine is 0.81; the pH of the solution is near 6.6.

It is heated for 8 hours at 70° C. and then 1 hour at 90°. The hx rate is 23%.

EXAMPLE 26

The copolymer acrylamide 70/ethyl thioacrylate 30 of Example 8 is used under the conditions of the latter together with O-methyl N-phenyl hydroxylamine hydrochloride. The molecular weight of the copolymer is 5,000. There is obtained an hx rate of 15% in 6 hours at 70° C.

EXAMPLE 27

Preparation in emulsion

The polyacrylamide of a molecular weight Mw=4,000 is taken in the form of 1 kg emulsion at 30% of this polymer, 35% kerosene and 35% water obtained in the presence of ethoxylated octyl phenol as a non-ionic surfactant. The proportion of hydroxylamine and potash are the same as in Examples 1 to 7 i.e., in absolute values 146.8 g $NH_2OH.HCl$ and 92.8 g KOH.

After 6 hours of heating at 70° C., the hx rate is 20%, the reaction medium remaining in emulsion state.

EXAMPLE 28

The operations of Example 4, that is heating for 6 hours at 70° C. terminated in 1 hour at 90° C., are repeated with the only difference that in the polyacrylamide solution there are dissolved 1.678 moles NaCl or 98.1 g of this salt. Thus, taking into account the KCl formed by the neutralization of the hydroxylamine hydrochloride, the reaction medium contains 3 moles of strong electrolyte. The hx rate rises to 37%, which shows the acceleration of the reaction under the ionic strength of the solution.

EXAMPLE 29

The polyacrylamide of Example 4 is replaced by the same amount of polyacrylamide of a molecular weight of 13,500. The hx rate is then 32%. A similar preparation, but carried out at 65° C. in 6 hours without the final heating at 90° C. leads to an hx rate of 15%.

EXAMPLE 30

Some of the products obtained according to the preceding examples have been tested as additives to a drilling mud of petroleum wells. The composition of the mud was:
1,000 g water containing 10 g of previously dissolved additive
200 g loading clay
50 g bentonite FB$_2$ (Clarsol FB$_2$) (trademark)

The viscosity in cp was measured on the mud by means of the viscosimeter FANN 35 at 600 turns/mn. Here are the viscosities found at 20° C. with different additives.

| Ex. No. | ADDITIVE | Viscosity cp |
|---|---|---|
| 30 | None (reference product) | 27.5 |
| 31 | Polyacrylamide of mol. weight 1,500 | 9.5 |
| 32 | Iron and chromium lignosulphonate ("Brixel" NF$_2$) | 19.0 |
| 33a | Product of Example 4 (hx = 34%) | 8.5 |
| 33b | Product of Example 4 (hx = 34%) purified | 6.5 |
| 34a | Product of shorter heating period (hx = 15%) | 13.0 |
| 34b | Product of shorter heating period (hx = 15%) purified | 11.0 |
| 35a | Product of Example 29 (polyacrylamide of a mol. weight 13,500; hx = 17%) | 20.0 |
| 35b | Product of Example 29 (polyacrylamide of a mol. weight 13,500; hx = 17%) purified | 17.0 |
| 36a | Product of Example 29 (polyacrylamide of a mol. weight 13,500; hx = 42%) | 21.0 |
| 36b | Product of Example 29 (polyacrylamide of a mol. weight 13,500; hx = 42%) purified | 11.5 |
| 37 | Product of Example 11 (hx = 28%) | 7.0 |
| 38 | Product of Example 9 (hx = 55%) | 6.0 |

Examples 33a and b show a remarkable effect of the hydroxamic groups when they are sufficiently numerous (hx rate=34%). The effect is still good but not superior to that of the polyacrylamide when the hx rate decreases to 15% as shown by Examples 34a and b. Excellent results are obtained with products prepared from Na acrylamide-acrylate copolymers (Example 37) prepared according to the procedure of Example 11.

From the comparison between Examples 33a, b and 34a, b and Examples 35a, b and 36a, b, it is noted that the products of low molecular weight (1,500) are much more effective than those having a MW exceeding 10,000 (13,5000).

EXAMPLES 39 TO 41

Measurements similar to those of Examples 30–38 are taken at 25° C. on muds that have been previously heated for 2 days respectively at 160° C. and 200° C. The additive contents of the muds is 5 g/l.

| | | Viscosities in cp at 25° C. | | |
|---|---|---|---|---|
| | | | after heating at | |
| Example No. | | Initial | 160° C. | 200° C. |
| 39 | reference product | 27.5 | 42 | 57 |
| 40 | Polyacrylamide 1500 | 9.5 | 21 | 30.5 |
| 41 | Product Ex. 4 type (hx rate 24%) | 8.0 | 10.2 | 14 |

It is remarkable that in the presence of a hydroxamic polymer (Ex. 41) the viscosity, greatly lowered at the start, increases only slightly by heating.

We claim:

1. A process for the preparation of a polymer with hydroxamic functions by heating an aqueous solution of polyacrylamide with hydroxylamine salt, which comprises carrying out the reaction at a temperature of from about 50° to 85° C., and wherein the replacement rate of the amido groups by the hydroxamic groups is controlled by using a proportion of hydroxylamine salt of about 0.2 to 1.2 mol per amide group present in the polyacrylamide used.

2. A process according to claim 1 wherein the reaction is carried out at a temperature between about 60° and 80° C.

3. A process for the preparation of a polymer with hydroxamic functions by heating an aqueous solution of polyacrylamide with hydroxylamine salt, which comprises carrying out the reaction at a temperature of from about 50° to 85° C., wherein the replacement rate of the amido groups by the hydroxamic groups is controlled by using a proportion of hydroxylamine salt of about 0.2 to 1.2 mol per amide group present in the polyacrylamide used, and wherein the remaining ammonia and hydroxylamine are eliminated from the reaction medium, after the heating, by a second heating of from about 85° to 100° C. for a period not exceeding about 2 hours.

4. A process according to claim 3, wherein the second heating is between about 15 and 75 minutes.

5. A process according to claim 3, wherein said proportion is between about 0.35 and 0.65 mols of hydroxylamine salt for each amide group of the polyacrylamide used.

6. A process according to claim 3, wherein the pH of the aqueous solution is between about 6.2 and 6.8.

7. A process according to claim 1, wherein a part of the acrylamide moieties in the polyacrylamide is replaced by moieties originating from monomers copolymerizable with the acrylamide, the monomers being selected from the group consisting of acrylic or methacrylic acid, an ester or salt thereof, maleic anhydride, vinyl ester, vinyl pyrrolidone, butadiene, styrene, acrylonitrile and alkanolacrylamide.

8. A process according to claim 1, wherein a part of the acrylamide moieties of the polymer used is replaced by moieties of a member selected from the group consisting of thioacrylates, thiomethacrylates and thioacrylamide.

9. A process according to claim 1, wherein the molecular weight of the polymer subjected to the action of the hydroxylamine salt has a molecular weight of from about 1,000 to 20,000.

10. A process according to claim 9, wherein the molecular weight is between about 1,200 and 6,000.

11. A process according to claim 1, wherein the hydroxylamine salt is a hydrochloride or sulphate of an R—NH—OR' substituted hydroxylamine wherein R and R' are organic substituents and either R or R' may be a hydrogen atom.

12. A process according to claim 1, wherein the hydroxylamine salt is that of thiohydroxylamine.

* * * * *